United States Patent [19]
Sato et al.

[11] Patent Number: 6,037,394
[45] Date of Patent: Mar. 14, 2000

[54] PRIMER COMPOSITION AND ARTICLE OBTAINED USING THE SAME

[75] Inventors: Kazuharu Sato, Myogi-machi; Masaaki Yamaya, Takasaki, both of Japan

[73] Assignee: Shin-Etsu Chemical Co., Ltd., Tokyo, Japan

[21] Appl. No.: 09/243,118

[22] Filed: Feb. 3, 1999

[30] Foreign Application Priority Data

Feb. 4, 1998 [JP] Japan ................................. 10-038112

[51] Int. Cl.⁷ ....................................... C08K 5/34
[52] U.S. Cl. ............................ 524/91; 524/261; 524/262; 524/263
[58] Field of Search ................................. 524/91, 94, 261, 524/262, 263

[56] References Cited

U.S. PATENT DOCUMENTS 4,315,848  2/1982  Dexter et al. ............................ 428/522
4,708,908  11/1987  Tateoka et al. ....................... 428/423.1

*Primary Examiner*—Kriellion Sanders
*Attorney, Agent, or Firm*—Oblon, Spivak, McClelland, Maier & Neustadt, P.C.

[57] ABSTRACT

A primer composition comprising (A) an acrylic resin, (B) a benzotriazole compound having not more than 1% by weight of heat loss when held at 150° C. for 1 hour, and (C) an organic solvent. Also disclosed are an article obtained by forming a primer coat of the primer composition on the surface of a substrate, and an article obtained by forming the primer coat on the surface of a transparent plastic substrate and coating on the primer coat a protective coat comprising a condensation type curable silicone resin. The primer coat, which contains the above benzotriazole compound as an ultraviolet light absorber, has a superior weatherability while maintaining a good adhesion to the substrate.

11 Claims, No Drawings

PRIMER COMPOSITION AND ARTICLE OBTAINED USING THE SAME

BACKGROUND OF THE INVENTION

1. Field of the Invention

This invention relates to a primer composition used to make silicone type hard coats adhere strongly to various substrates, inparticular, transparent plastic substrates, and also relates to an article having a primer coating, obtained using the primer composition. More particularly, this invention relates to a primer composition containing a benzotriazole derivative having a small heat loss, contained as an ultraviolet light absorber having a superior anti-volatility when processed at a high-temperature and having a superior retention in a primer coat thin film formed.

2. Description of the Prior Art

Among various substrates, plastic substrates which are light-weight and have superior impact resistance and transparency have been used widely as substitutes for glass. They, however, have disadvantages such that they loose transparency easily because of their low surface hardness and tendency to be scratched, and also they become yellow outdoors easily because of their poor weatherability. Other substrates such as metals, ceramics and wood workpieces also have similar disadvantages more or less.

Accordingly, various methods are proposed in order to improve weatherability and scratch resistance (or wear resistance) of articles making use of such substrates.

In order to improve scratch resistance, it is attempted to treat a substrate surface with, e.g., a silicone type hard-coating material composed chiefly of a hydrolyzable silane and/or a partial hydrolysis-condensation product thereof, to cover it with a high-hardness protective film. In this method, when treated with the hard-coating material directly, the coat formed has a poor adhesion, and hence a primer coat of various types is provided before the protective coat is formed on the substrate. In many cases, ultraviolet light absorbers of various types are contained in such primer coats so that the weatherability of substrates can be improved.

Known ultraviolet light absorbers used generally for such purpose include salicylic acid type ultraviolet light absorbers such as phenyl salicylate, benzophenone type ultraviolet light absorbers such as hydroxybenzophenone and 2,4-dihydroxy-4-methoxybenzophenone, benzotriazole type ultraviolet light absorbers such as 2-(2'-hydroxy-5'-methylphenyl)benzotriazole and 2-(2'-hydroxy-3',5'-di-t-butylphenyl)benzotriazole, and cyanoacrylate type ultraviolet light absorbers such as 2-methylhexyl-2-cyano-3,3'-diphenyl acrylate and ethyl-2-cyano-3,3'-diphenyl acrylate. In particular, those put into wide and general use in view of a good solubility in various solvents and resins are 2-(2'-hydroxy-5'-t-butylphenyl)benzotriazole and 2,4-dihydroxybenzophenone. These, however, may become decomposed or volatilized when primers or coating materials are heated to cure, so that the ultraviolet light absorber can not be incorporated in a sufficient quantity into the coating formed finally, making it difficult to achieve a sufficient weatherability.

In practice, used as ultraviolet light absorbers are, e.g., benzylidene malonate compounds and/or cyanoacrylate compounds as disclosed in Japanese Pre-examination Patent Publication (kokai) No. 55-160033, benzophenone compounds and/or triazine compounds as disclosed in Japanese Pre-examination Patent Publication (kokai) No. 58-179237, and benzotriazole compounds as disclosed in Japanese Pre-examination Patent Publication (kokai) Nos. 1-149879 and 2-182764. All the ultraviolet light absorbers, however, have a relatively low molecular weight, and hence may become decomposed partly or volatilized at the time of heat curing when primer coats or protective coats are provided, resulting in an insufficient ultraviolet screening effect. Thus, they have not reached a satisfactory level in respect of weatherability.

SUMMARY OF THE INVENTION

Accordingly, an object of the present invention is to provide a primer composition which have eliminated the disadvantages the prior art has had, and can form a primer coat having a weatherability high enough to satisfy durability under long-term severe conditions while maintaining a good adhesion to the substrate, on account of employing an ultraviolet light absorber which may become neither volatilized nor decomposed even at a high temperature and has a low heat loss; an article having on its surface such a primer coat having a superior weatherability; and an article having on the surface of a transparent plastic substrate the primer coat and formed thereon a protective coat having a superior scratch resistance.

To achieve the above object, the present invention provides a primer composition comprising;

(A) an acrylic resin;
(B) a benzotriazole compound having not more than 1% by weight of heat loss when held at 150° C. for 1 hour; and
(C) an organic solvent.

The present invention also provides an article having a primer coat on the surface of a substrate, which is obtained by coating the above primer composition on the surface of the substrate, followed by curing to form the primer coat.

The present invention still also provides an article having a primer coat on the surface of a substrate and a protective coat formed on the primer coat, which is obtained by forming a primer coat on the surface of a transparent plastic substrate in the same manner as the above, and coating on the primer coat a silicone type hard-coating fluid containing at least one siloxane compound selected from an alkoxysilane and a partial hydrolysis-condensation product thereof, to form the protective coat.

DESCRIPTION OF THE PREFERRED EMBODIMENTS

The present invention will be described below in detail.

Primer Composition

The primer composition of the present invention is used to form a hard coat, and contains the following components (A) to (C) as essential components.

(A) Acrylic Resin:

There are no particular limitations on the component-(A) acrylic resin so long as it belongs to acrylic resins soluble in organic solvents. Conventionally known thermosetting acrylic resins, moisture-curing acrylic resins, thermoplastic acrylic resins and acrylic resins obtained by modifying any of these with silane or siloxane may be used.

In the present invention, taking account of adhesion to a protective coat in an instance where an article comprising a transparent plastic (molded product) substrate, a primer coat formed on the substrate and a protective coat (formed of a condensation type silicone resin) further formed on the primer coat is produced, preferred is a copolymer of an acrylic monomer containing an alkoxysilyl group and/or a vinyl monomer containing an alkoxysilyl group (hereinafter these are called "alkoxysilyl-group-containing monomer" collectively) with an additional monomer copolymerizable with the alkoxysilyl-group-containing monomer.

The alkoxysilyl-group-containing monomer is a compound represented by the general formula (1):

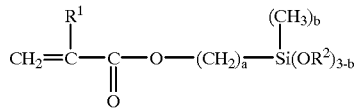

(1)

wherein $R^1$ is a hydrogen atom or a methyl group; $R^2$ is a monovalent hydrocarbon group having 1 to 6 carbon atoms, selected from an alkyl group such as a methyl group or a propyl group, an alkenyl group such as a vinyl group or an allyl group, and an aryl group such as a phenyl group; and a is an integer of 1 to 3 and b 0 or 1.

Specific examples of the compound include γ-methacryloxypropyltrimethoxysilane, γ-methacryloxypropyltriethoxysilane, γ-methacryloxypropyltributoxysilane, γ-methacryloxypropyltriisopropenoxysilane, methacryloxymethyltrimethoxysilane, methacryloxymethyltriethoxysilane, methacryloxymethyltributoxysilane, γ-acryloxypropyltrimethoxysilane, γ-acryloxypropyltriethoxysilane, γ-acryloxypropyltributoxysilane, acryloxymethyltrimethoxysilane, acryloxymethyltriethoxysilane, acryloxymethyltributoxysilane, γ-methacryloxypropylmethyldimethoxysilane, γ-methacryloxypropylmethyldiethoxysilane, γ-methacryloxypropylmethyldibutoxysilane, methacryloxymethylmethyldimethoxysilane, methacryloxymethylmethyldiethoxysilane, methacryloxymethylmethyldibutoxysilane, γ-acryloxypropylmethyldimethoxysilane, γ-acryloxypropylmethyldiethoxysilane, γ-acryloxypropylmethyldibutoxysilane, acryloxymethylmethyldimethoxysilane, acryloxymethylmethyldiethoxysilane and acryloxymethylmethyldibutoxysilane. Of these, γ-methacryloxypropyltrimethoxysilane, γ-acryloxypropyltrimethoxysilane, γ-methacryloxypropylmethyldimethoxysilane and γ-acryloxypropylmethyldimethoxysilane are preferred in view of cross-link densitiy and reactivity.

The alkoxysilyl group-containing monomer may also be a vinyl functional alkoxysilane represented by the general formula (2):

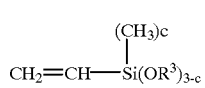

(2)

wherein $R^3$ is the same monovalent hydrocarbon group having 1 to 6 carbon atoms as that represented by $R^2$ in the general formula (1) or an alkyloxyalkyl group, and c is an integer of 0 or 1; or a vinyl functional alkoxysilane or styryl functional alkoxysilane represented by the general formula (3) or (4):

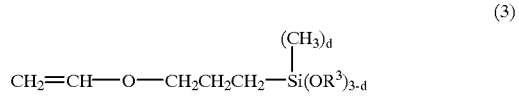

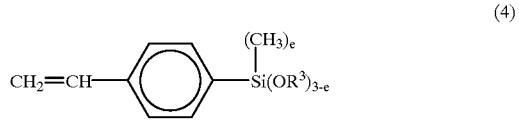

wherein $R^3$ is as defined in the general formula (2), and d and e are each an integer of 0 or 1.

Examples of the compounds of the general formulas (3) and (4), include vinyltrimethoxysilane, vinyltriethoxysilane, vinyltributoxysilane, vinyl-tris(2-methoxyethoxy)silane, vinylmethyldiethoxysilane, vinylmethyldibutoxysilane, vinylmethyl-bis(2-methoxyethoxy)silane, γ-vinyloxypropyltrimethoxysilane, γ-vinyloxypropyltriethoxysilane, γ-vinyloxypropylmethyldimethoxysilane, γ-vinyloxypropylmethyldiethoxysilane, γ-vinyloxypropylmethyldibutoxysilane and styryltrimethoxysilane. Of these, vinyltrimethoxysilane, vinyltriethoxysilane, γ-vinyloxypropyltrimethoxysilane and styryltrimethoxysilane are preferred in view of readiness to handle and reactivity.

Then, the additional monomer copolymerizable with the alkoxysilyl-group-containing monomer may be exemplified by alkyl methacrylates such as methyl methacrylate, butyl methacrylate and 2-ethylhexyl methacrylate; alkyl acrylates such as methyl acrylate, ethyl acrylate and butyl acrylate; vinyl ethers such as glycidyl methacrylate, acrylamide, acrylonitrile, vinyl acetate, ethyl vinyl ether, butyl vinyl ether and hexyl vinyl ether; styrene; ethylene glycol dimethacrylate oligomers; perfluorobutyl (meth)acrylates; perfluoroalkyl (meth)acrylates; poly(oxyethylene) (meth) acrylates; and poly(oxyalkylene) (meth)acrylates.

The above acrylic resin, i.e., the copolymer of an alkoxysilyl-group-containing monomer with an additional monomer copolymerizable with the alkoxysilyl-group-containing monomer can be obtained readily by adding to a solution containing these monomers a radical polymerization catalyst selected from peroxides such as dicumyl peroxide and benzoyl peroxide or azo compounds such as azobisbutyronitrile, and allowing the resultant mixture to react under heating. The alkoxysilyl group may be contained in the acrylic resin in an amount of from 1 to 30% by weight, and particularly from 1 to 20% by weight. If it is in an amount less than 1% by weight, the resultant primer coat may have no sufficient moisture-curing properties and it may be impossible to make the ultraviolet light absorber stand fixed in a large quantity in the primer coat thin layer. If it is in an amount more than 30% by weight, the primer coat formed may be so hard as to have a low adhesion to the substrate.

Meanwhile, the thermoplastic acrylic resin may be exemplified by homopolymers [polyalkyl (meth)acrylates] such as methyl (meth)acrylate and butyl (meth)acrylate, and copolymers of these.

As the component-(A) acrylic resin, the thermosetting acrylic resin, moisture-curing acrylic resin or thermoplastic acrylic resin may each be used alone. In an instance where a flexibility is to be imparted to the coating, it is preferable to use the thermosetting acrylic resin and the thermoplastic acrylic resin in combination. In such an instance, the thermoplastic acrylic resin may be contained in an amount not more than 30% by weight based on the total weight of the component-(A) acrylic resin. If it is in an amount more than 30% by weight, the present composition may have a poor adhesion to the upper layer.

In the primer composition of the present invention, an amide compound shown below may preferably be used as component (D) in combination. This amide compound is a compound obtained by amidization of a reaction product of an amino functional alkoxysilane, an epoxy functional alkoxysilane and a silylating agent. It imparts to the primer composition a water resistance and a good adhesion, and also, upon cross-linking of the alkoxysilyl group in the molecule to the component-(A) acrylic resin, makes the component-(B) benzotriazole compound stand fixed in the primer coat thin layer.

The amino functional alkoxysilane used here may be exemplified by N-(2-aminoethyl)-3-aminopropyltrimethoxysilane, N-(2-aminoethyl)-3-aminopropyltriethoxysilane, N-(2-aminoethyl)-3-aminopropylmethyldiethoxysilane, 3-aminopropylmethyldimethoxysilane, 3-aminopropyltriethoxysilane, N-(4-aminobutyl)-3-aminopropyltrimethoxysilane, N-(4-aminobutyl)-3-aminopropylmethyldimethoxysilane, N-(6-aminohexyl)-3-aminopropyltrimethoxysilane, N-(6-aminohexyl)-3-aminopropylmethyldimethoxysilane, N-(2-aminoethyl)-aminomethylstyryltrimethoxysilane and N-(2-aminoethyl)-aminomethylstyrylmethyldimethoxysilane. In particular, N-(2-aminoethyl)-3-aminopropyltrimethoxysilane and N-(2-aminoethyl)-3-aminopropylmethyldimethoxysilane are preferred in view of adhesion and operability.

The epoxy functional alkoxysilane used here may also be exemplified by 3-glycydoxypropyltrimethoxysilane, 3-glycydoxypropylmethyldimethoxysilane, 3-glycydoxypropyltriethoxysilane, 3-glycidoxypropylmethyldiethoxysilane, 2-(3,4-epoxycyclohexyl)ethyldimethoxysilane, 2-(3,4-epoxycyclohexyl)ethyltrimethoxysilane, 5,6-epoxyhexyltrimethoxysilane, 5,6-epoxyhexylmethyldimethoxysilane, 7,8-epoxyoctyltrimethoxysilane and 9,10-epoxydecyltrimethoxysilane. In particular, 3-glycydoxypropyltrimethoxysilane, 3-glycydoxypropylmethyldimethoxysilane, 2-(3,4-epoxycyclohexyl)ethyldimethoxysilane and 2-(3,4-epoxycyclohexyl)ethyltrimethoxysilane are preferred in view of reactivity and operability.

The silylating agent used here may be exemplified by hexamethyldisilazane, N,N-bis(trimethylsilyl)formamide and N,N'-bis(trimethylsilyl)urea. This agent protects OH groups produced upon reaction of the amino functional alkoxysilane with epoxy functional alkoxysilyl groups, to prevent the OH groups from reacting with the alkoxysilyl groups to thereby prevent the reaction product from changing with time.

This reaction between the amino functional alkoxysilane, the epoxy functional alkoxysilane and the silylating agent may be carried out by adding the epoxy functional alkoxysilane dropwise to a mixture of the amino functional alkoxysilane and the silylating agent, and allowing them to react under heating. Alternatively, the reaction may be carried out by allowing the amino functional alkoxysilane to react with the epoxy functional alkoxysilane, followed by addition of the silylating agent to the reaction product of the both to allow them to react. In this reaction, the amino functional alkoxysilane and the epoxy functional alkoxysilane may be mixed in a ratio ranging from 0.3 to 1.2 as molar ratio of epoxy groups to amino groups. If these are in a molar ratio less than 0.3, the number of alkoxyl groups per molecule which participate in the cross-linking is so small as to make the composition less curable and also the number of epoxy groups capable of reacting with amino groups is so small as to make adhesion low. If on the other hand it is more than 1.2, =N—H groups that can be converted into an amide in the amidization described below.

Then, this reaction product is converted into an amide to form an amide compound. This amidization may be carried out by allowing the reaction product to react with an acid halide, acid anhydride or acid isopropenyl compound of a carboxylic acid, as exemplified by acetic acid chloride, acetic acid bromide, propionic acid chloride, acetic anhydride and isopropenyl acetate. The reaction product thus obtained may be added to the component-(A) acrylic resin in an amount ranging from 1 to 10% by weight. If it is in an amount less than 1% by weight, the composition may adhere insufficiently to the substrate. If on the other hand it is in an amount more than 10% by weight, the primer layer formed may have so high a cross-link density as to make the resultant coating have a high hardness, resulting conversely in a poor adhesion.

(B) Benzotriazole Compound:

The component-(B) benzotriazole compound has not more than 1% by weight of heat loss when held at 150° C. for 1 hour, and plays a role as an ultraviolet light absorber. The "benzotriazole compound" herein means a compound having benzotriazole rings in its molecule. Such a benzotriazole compound can remain in the primer coat film almost without volatilizing and can maintain its superior ultraviolet-light-screening ability, even when the primer composition or its hard-coat wet coating is heated to a heat-curing temperature (usually from 80 to 150° C.) or even when the article having a cured-product layer of the primer composition of the present invention is exposed to a high temperature.

Examples of the benzotriazole compound, meeting the above heat-loss requirement, include 6-(2-benzotriazolyl)-4-t-octyl-6'-t-butyl-4'-methyl-2,2'-methylenebisphenol and 2-[2'-hydroxy-3',5'-bis( α,α-dimethylbenzyl)phenyl]benzotriazole. In particular, 6-(2-benzotriazolyl)-4-t-octyl-6'-t-butyl-4'-methyl-2,2'-methylenebisphenol and 2-[2'-hydroxy-3',5'-bis(α,α-dimethylbenzyl)phenyl]benzotriazole are preferred.

This benzotriazole compound may be contained in an amount of from 0.1 to 30% by weight, and particularly from 1 to 20% by weight, based on the whole components of the primer composition but excluding the organic solvent. If it is in an amount less than 0.1% by weight, the effect of ultraviolet light absorption (or screening) may be obtained with difficulty to make it impossible to prevent the substrate from yellowing. If it is in an amount more than 30% by weight, the primer composition may become turbid to make it difficult to obtain transparent primer coat films.

(C) Organic Solvent:

The component-(C) organic solvent may be exemplified by alcohols such as methanol, ethanol, isobutanol, t-butanol, ethoxyethanol and diacetone alcohol, ketones such as methyl isobutyl ketone and methyl ethyl ketone, esters such as ethyl acetate and isobutyl acetate, ethers such as propylene glycol monomethyl ether and ethylene glycol monoethyl ether, aromatic solvents such as toluene and xylene, and mixtures of any of these.

The organic solvent may be contained in such an amount that the solid matter in the primer composition is in a concentration of preferably from 1 to 30% by weight, and particularly preferably from 5 to 15% by weight.

Article Having Primer Coat on Substrate Surface, and Article Having Primer Coat on Substrate Surface and Protective Coat on the Primer Coat The article having the primer coat on the substrate surface can be obtained by coating the primer composition on the surface of a substrate, followed by drying or heating to volatilize the organic solvent and/or heating to effect curing to form the primer coat. As the substrate, usable are plastics, metals, ceramics, wood workpieces, glasses and composites of any of these. The primer composition may usually be heated at a temperature of from 80 to 150° C., and preferably from 120 to 150° C. The primer coat may commonly have a thickness of from about 0.1 to 10 μm, which may be selected in accordance with the purpose for which the products are used.

The primer composition of the present invention is especially useful as a primer for substrates and silicone type hard-coating materials. In particular, its application to optical articles is preferred, and hence transparent plastics are preferred as the substrates.

The article having a primer coat on the surface of such a substrate and a protective coat formed on the primer coat can be obtained by forming a primer coat on the surface of a transparent plastic substrate in the same manner as the above, and further coating thereon a silicone type hard-coating fluid containing at least one siloxane compound selected from an alkoxysilane and a partial hydrolysis-condensation product thereof, followed by curing to form a protective coat. The hard-coat wet coating formed may preferably be cured by heating, which may usually be done at a temperature of from 80 to 150° C. like that in the case of the primer composition, and preferably from 120 to 150° C. The primer coat may commonly have the thickness as described above. The protective coat may also commonly have a thickness of from about 0.1 to 10 μm, which may be selected in accordance with the purpose for which the products are used.

The primer coat obtained in the manner as described above has both superior weatherability (in particular, protection from ultraviolet light deterioration) and superior adhesion. The protective coat also has a high hardness, and hence has a superior scratch resistance.

The alkoxysilane used as an effective component (a hard-coating agent) in the silicone type hard-coating fluid for the protective coat is a siloxane compound represented by the general formula:

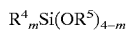

$R^4{}_m Si(OR^5)_{4-m}$ wherein $R^4$ is a monovalent hydrocarbon group having 1 to 6 carbon atoms, $R^5$ is a monovalent hydrocarbon group having 1 to 6 carbon atoms or an alkyloxyalkyl group, and m is an integer of 0, 1 or 2.

Specific examples thereof include tetramethoxysilane, tetraethoxysilane, tetrapropoxysilane, tetrabutoxysilane, methyltrimethoxysilane, methyltriethoxysilane, methyltripropoxysilane, methyltributoxysilane, ethyltriethoxysilane, vinyltrimethoxysilane, vinyltriethoxysilane, phenyltrimethoxysilane, phenyltriethoxysilane and dimethyldimethoxysilane. In particular, tetramethoxysilane, tetraethoxysilane, methyltrimethoxysilane and methyltriethoxysilane are preferred. Any of these alkoxysilanes may used alone or in combination of two or more. As the silicone type hard-coating agent, a partial hydrolysis-condensation product of the alkoxysilane (i.e., a siloxane prepolymer) may also be used. Besides, a mixture of the alkoxysilane and its partial hydrolysis-condensation product may be used.

Concentration of the silicone type hard-coating fluid may be adjusted with an alcohol type solvent such as methanol, ethanol, isobutanol or diacetone alcohol, being so adjusted as to be preferably from 5 to 60% by weight, and particularly from 10 to 40% by weight, in approximation, as a solid-matter concentration after curing.

To this silicone type hard-coating fluid, a metal oxide sol as a filler or reinforcing agent may preferably be added in order to more improve the scratch resistance of the protective coat. In the case when the alkoxysilane is used as the hard-coating agent, it may be subjected to hydrolysis at 0 to 30° C. optionally in the presence of a catalyst exemplified by a mineral acid such as hydrochloric acid or an organic acid such as acetic acid or oxalic acid, thus a partial hydrolysis-condensation product of the alkoxysilane is formed. The metal oxide sol may be added before the hydrolysis or may be added after it. As this metal oxide sol, usable are fine inorganic oxide particles comprising an oxide of one or more metal(s) selected from Si, Al, Sn, Sb, Ti, Fe, Zn, W, Zr and Ce, or mixtures of such fine inorganic oxide particles; or fine particles of composites of these oxides (fine composite oxide particles).

The fine inorganic oxide particles may include, in the case of, e.g., fine silicon oxide particles, silica sols prepared by dispersing water-dispersed colloidal silica as an aqueous dispersion in an organic solvent such as methanol, isobutanol, isopropanol or dimethylformamide as an organic solvent system. As to other fine inorganic oxide particles of Al, Sn, Sb, Ti, Fe, Zn, W, Zr and Ce, too, the fine inorganic oxide particles may include those comprising similarly the aqueous dispersion and the organic solvent system. The mixtures of the fine inorganic oxide particles may include fine mixed particles of at least two of iron oxide, titanium oxide, selenium oxide, zirconium oxide, antimony oxide, zinc oxide, tin oxide and aluminum oxide, and mixed particles of at least one of these oxides and other oxide. The fine composite oxide particles may include fine particles of composites of at least two of the iron oxide and so forth exemplified above.

The fine inorganic oxide particles may preferably be contained in an amount of from 10 to 80% by weight based on the weight of the alkoxysilane and/or its partial hydrolysis-condensation product.

EXAMPLES

The present invention will be described below in greater detail. The present invention is by no means limited to these Examples.

Example 1

Synthesis of Thermosetting Acrylic Resin:

Into 10-liter separable flask, 1,260 parts by weight of isobutyl acetate and 1,260 parts by weight of isopropyl alcohol were charged, and the temperature was kept at 80° C. to 90° C. Then, after addition of 20 parts by weight of benzoyl peroxide as a polymerization initiator, a solution of mixture of 1,640 parts by weight of methyl methacrylate monomer, 500 parts by weight of γ-methacryloxypropyltrimethoxysilane, 180 parts by weight of glycidyl methacrylate, 130 parts by weight of ethyl acrylate and 130 parts by weight vinyl acetate monomer was added dropwise thereto. After its addition was completed, the reaction mixture was aged for 5 hours while keeping the temperature at 80° C. to 90° C., followed by cooling to room temperature, where 3,670 parts by weight of diacetone alcohol was added as a diluting solvent to obtain a thermosetting acrylic resin solution. This solution had a concentration (quantity of effective components) of 40%.

Synthesis of Thermoplastic Acrylic Resin:

Into 10-liter separable flask, 2,467 parts by weight of methyl isobutyl ketone, 2,000 parts by weight of isobutyl acetate, 2,533 parts by weight of propylene glycol monomethyl ether and 384 parts by weight of polymethyl methacrylate (PMMA) resin were charged, followed by heating at 60° C. to 80° C. for 2 hours. Having made sure that PMMA pellets dissolved uniformly, the mixture was cooled to room temperature. Then, 1,067 parts by weight of isopropyl alcohol and 720 parts by weight of diacetone alcohol were added to prepare a thermoplastic acrylic resin solution. This solution had a concentration of 4%.

Synthesis of Amide Compound:

Into 5-liter separable flask, 900 parts by weight of N-β-(aminoethyl)-γ-aminopropyltrimethoxysilane and 800 parts by weight of hexamethyldisilazane were charged, and the temperature was kept at 100° C. to 110° C. Thereafter, 2,000 parts by weight of γ-glycidoxypropylmethyldimethoxysilane was added dropwise, followed by stripping to remove unreacted matter. Thereafter, 500 parts by weight of toluene and 500 parts by weight of acetic anhydride were added to obtain an amide compound solution. To this solution, 500 parts by weight of methanol was added, followed by heating at 50° C. to 60° C. for 5 hours. Then, this solution was subjected to stripping under reduced pressure to remove the solvent, and thereafter its concentration (quantity of effective components) was adjusted with propylene glycol monomethyl ether to 25%.

| Next; | (by weight) |
|---|---|
| the above thermosetting acrylic resin solution | 100 parts; |
| the above thermosetting acrylic resin solution | 100 parts; |
| the above amide compound solution and | 10 parts; |
| 6-(2-benzotriazolyl)-4-t-octyl-6'-t-butyl-4'-methyl-2,2'-methylenebisphenol (150° C./ 1 hour heat loss: 0.2% by weight) | 2 parts | were mixed to make an acrylic primer composition containing an ultraviolet light absorber. This composition was coated on glass plates, followed by heating for 1 hour at each temperature of 80° C., 120° C. and 150° C. to effect curing to form primer coats of 3 μm thick, thus articles each comprising a glass plate provided with the primer coat on its surface were produced. These are designated as sample 1a.

On the sample 1a, the effect of screening light in the ultraviolet to visible region of about 300 to 400 nm was examined using a variable spectrophotometer. As the result, the ultraviolet light absorber neither decomposed nor volatilized at any temperatures, showing a sufficient light-screening effect.

The above primer composition was also coated on a polycarbonate plate, and was heated at 120° C. for 1 hour to effect curing to form a primer coat of 3 μm thick. On this primer coat, a silicone type hard-coating fluid was coated which was obtained by dissolving or dispersing 1,640 parts by weight of methyltriethoxysilane and 1,380 parts by weight of water-dispersed colloidal silica (silica solid content: 20% by weight) in 460 parts by weight of isobutanol followed by hydrolysis at 5° C. to 10° C. in the presence of a hydrochloric acid catalyst. The wet coating formed was heated for 1 hour to effect curing to form a protective coat of 3 μm thick. Thus, an article comprising a polycarbonate plate provided with the primer coat on its surface and a protective coat on the primer coat was produced. This is designated as sample 1b.

On the sample 1b, a weatherability test was made using a sunshine carbon weatherometer. As the result, even after 5,000 hours, neither yellowing nor changes in appearance and adhesion were seen.

Example 2

An acrylic primer composition containing an ultraviolet light absorber was prepared in the same manner as in Example 1 except that the ultraviolet light absorber used therein was replaced with 2-[2'-hydroxy-3',5'-bis(α,α-dimethylbenzyl)phenyl]benzotriazole (150° C./1 hour heat loss: 0.2% by weight). Using this composition, the subsequent procedure of Example 1 was repeated to effect heat-curing at each temperature. Thus, articles (sample 2a) each comprising a glass plate provided with a 3 μm thick primer coat on its surface were produced. On this sample 2a, the effect of screening light in the ultraviolet to visible region was examined in the same manner as in Example 1. As the result, the ultraviolet light absorber neither decomposed nor volatilized at any temperatures, showing a sufficient light-screening effect.

Using the above primer composition and the same hard-coating fluid as that in Example 1, an article (sample 2b) comprising a polycarbonate plate provided with a 3 μm thick primer coat on its surface and a 3 μm thick protective coat on the primer coat was further produced in the same manner as in Example 1. On this sample 2b, a weatherability test was made in the same manner as in Example 1. Even after 5,000 hours, no changes in appearance and adhesion were seen.

Example 3

Synthesis of Thermosetting Acrylic Resin:

Into 10-liter separable flask, 1,260 parts by weight of diacetone alcohol was charged, and the temperature was kept at 80° C. to 90° C., where 20 parts by weight of 2,2'-azobis(2-methylbutyronitrile) was added thereto. Then, a solution of mixture of 1,140 parts by weight of methyl methacrylate monomer, 1,000 parts by weight of γ-methacryloxypropyltrimethoxysilane, 180 parts by weight of glycidyl methacrylate, 130 parts by weight of ethyl acrylate and 130 parts by weight vinyl acetate monomer was added dropwise thereto. After its addition was completed, the reaction mixture was aged for 5 hours while keeping the temperature at 80° C. to 90° C., followed by cooling to room temperature, where 3,670 parts by weight of diacetone alcohol was added as a diluting solvent to obtain a thermosetting acrylic resin solution in a concentration of 40%.

| Next; | (by weight) |
|---|---|
| the above thermosetting acrylic resin solution | 100 parts; |
| the above thermosetting acrylic resin solution | 100 parts; |
| the amide compound solution prepared in Example 1 and | 10 parts; |
| 6-(2-benzotriazolyl)-4-t-octyl-6'-t-butyl-4'-methyl-2,2'-methylenebisphenol | 2 parts | were mixed to make an acrylic primer composition containing an ultraviolet light absorber. Using this composition, the subsequent procedure of Example 1 was repeated to effect heat-curing at each temperature. Thus, articles (sample 3a) each comprising a glass plate provided with a 3 μm thick primer coat on its surface were produced. On this sample 3a, the effect of screening light in the ultraviolet to visible region was examined in the same manner as in Example 1. As the result, the ultraviolet light absorber neither decomposed nor volatilized at any temperatures, showing a sufficient light-screening effect.

Using the above primer composition and the same hard-coating fluid as that in Example 1, an article (sample 3b) comprising a polycarbonate plate provided with a 3 μm thick primer coat on its surface and a 3 μm thick protective coat on the primer coat was further produced in the same manner as in Example 1. On this sample 3b, a weatherability test was made in the same manner as in Example 1. Even after 5,000 hours, no changes in appearance and adhesion were seen.

Example 4

|  | (by weight) |
|---|---|
| The thermosetting acrylic resin solution prepared in Example 1 | 100 parts; |
| the amide compound solution prepared in Example 1 and | 10 parts; |
| 6-(2-benzotriazolyl)-4-t-octyl-6'-t-butyl-4'-methyl-2,2'-methylenebisphenol | 10 parts | were mixed to make an acrylic primer composition containing an ultraviolet light absorber. Using this composition, the subsequent procedure of Example 1 was repeated to effect heat-curing at each temperature. Thus, articles (sample 4a) each comprising a glass plate provided with a 3 μm thick primer coat on its surface were produced. On this sample 4a, the effect of screening light in the ultraviolet to visible region was examined in the same manner as in Example 1. As the result, the ultraviolet light absorber neither decomposed nor volatilized at any temperatures, showing a sufficient light-screening effect.

Using the above primer composition and the same hard-coating fluid as that in Example 1, an article (sample 4b) comprising a polycarbonate plate provided with a 3 μm thick primer coat on its surface and a 3 μm thick protective coat on the primer coat was further produced in the same manner as in Example 1. On this sample 4b, a weatherability test was made in the same manner as in Example 1. Even after 5,000 hours, no changes in appearance and adhesion were seen.

Comparative Example 1

An acrylic primer composition containing an ultraviolet light absorber was prepared in the same manner as in Example 1 except that the ultraviolet light absorber used therein was replaced with 2-(2'-hydroxy-5'-t-butylphenyl)benzotriazole (150° C./1 hour heat loss: 50% by weight or more) (trade name: TINUVIN-PS; available from Ciba-Geigy). Using this composition, the subsequent procedure of Example 1 was repeated to effect heat-curing at each temperature. Thus, articles (sample 1'a) each comprising a glass plate provided with a 3 μm thick primer coat on its surface were produced. On this sample 1'a, the effect of screening light in the ultraviolet to visible region was examined in the same manner as in Example 1. As the result, the light-screening effect was seen at 80° C., but the light-screening effect was found not to be attained at all at 120° C. or above.

Using the above primer composition and the same hard-coating fluid as that in Example 1, an article (sample 1'b) comprising a polycarbonate plate provided with a 3 μm thick primer coat on its surface and a 3 μm thick protective coat on the primer coat was further produced in the same manner as in Example 1. On this sample 1'b, a weatherability test was made in the same manner as in Example 1. As the result, after 1,000 hours, the whole sample yellowed and the protective coat was seen to have come off.

Comparative Example 2

An acrylic primer composition containing an ultraviolet light absorber was prepared in the same manner as in Comparative Example 1 except that the ultraviolet light absorber used therein was replaced with 2,4-dihydroxybenzophenone (150° C./1 hour heat loss: 50% by weight or more). Using this composition, the subsequent procedure of Example 1 was repeated to effect heat-curing at each temperature. Thus, articles (sample 2'a) each comprising a glass plate provided with a 3 μm thick primer coat on its surface were produced. On this sample 2'a, the effect of screening light in the ultraviolet to visible region was examined in the same manner as in Example 1. As the result, the light-screening effect was seen at 80° C., but the light-screening effect was found to have reduced to half at 120° C. and not to be attained at all at 150° C.

Using the above primer composition and the same hard-coating fluid as that in Example 1, an article (sample 2'b) comprising a polycarbonate plate provided with a 3 μm thick primer coat on its surface and a 3 μm thick protective coat on the primer coat was further produced in the same manner as in Example 1. On this sample 2'b, a weatherability test was made in the same manner as in Example 1. As the result, after 2,000 hours, the sample yellowed and the protective coat was seen to have come off partly.

The results of the ultraviolet light-screening effect and weatherability examined and tested on Examples 1 to 4 and Comparative Examples 1 and 2 are shown together in Tables 1 and 2.

TABLE 1

| Heat-curing temperature | 80° C. | 120° C. | 150° C. |
|---|---|---|---|
| Example 1 | AA | AA | AA |
| Example 2 | AA | AA | AA |
| Example 3 | AA | AA | AA |
| Example 4 | AA | AA | AA |
| Comparative Example 1 | A | C | C |
| Comparative Example 2 | A | B | C |

Ultraviolet Light-Screening Effect:

AA: The primer coat contains the ultraviolet light absorber in a sufficient quantity, and hence a sufficient light-screening effect is seen.

A: The primer coat contains the ultraviolet light absorber in part, and hence a light-screening effect is still seen.

B: The light-screening effect has reduced to half.

C: The light-screening effect is not seen at all.

Weatherability Test Results:

TABLE 2

| Weatherability test time: | Initial stage | 1000 hours | 2000 hours | 5000 hours |
|---|---|---|---|---|
| Example 1 | 100/100 | 100/100 | 100/100 | 100/100 |
| Appearance: | No change | No change | No change | No change |
| Example 2 | 100/100 | 100/100 | 100/100 | 100/100 |
| Appearance: | No change | No change | No change | No change |
| Example 3 | 100/100 | 100/100 | 100/100 | 100/100 |
| Appearance: | No change | No change | No change | No change |
| Example 4 | 100/100 | 100/100 | 100/100 | 100/100 |
| Appearance: | No change | No change | No change | No change |
| Comparative | 100/100 | 0/100 | — | — |

TABLE 2-continued

| Weatherability test time: | Initial stage | 1000 hours | 2000 hours | 5000 hours |
|---|---|---|---|---|
| Example 1 | | | | |
| Appearance: | No change | Yellowed | — | — |
| Comparative Example 2 | 100/100 | 100/100 | 0/100 | — |
| Appearance: | No change | No change | Yellowed | — |

Remarks:

"100/100" means that the adhesion is good (100% adhesion), and "0/100" means that the adhesion is zero (no adhesion at all).

As can be seen from Table 1, the ultraviolet light absorber used in Comparative Example 1 decomposes and volatilizes upon heating at 120° C., resulting in loss of the ultraviolet light-screening effect. On the other hand, the benzotriazole compound used in Example 1 neither decomposes nor volatilizes even upon heating at 150° C., showing a sufficient ultraviolet light-screening effect.

As also can be seen from Table 2, the ultraviolet light absorber benzotriazole compounds used in Examples 1 to 4 neither decompose nor volatilize also in the weatherability test made after the primer compositions and hard-coat wet coatings are both heated to cure, and can remain in the primer coats in a sufficient quantity. Thus, they are durable to long-term weatherability tests.

As described above, since the primer composition of the present invention employs as an ultraviolet light absorber the benzotriazole compound having less heat loss, the ultraviolet light absorber neither decomposes nor volatilizes even at high temperatures and can remain in the primer coat thin film in a large quantity after curing. Hence, a primer coat can be formed which has a weatherability (in particular, protection from ultraviolet light deterioration) that satisfies durability under long-term severe conditions while maintaining a good adhesion to the substrate. Moreover, forming the high-hardness protective coat comprising the silicone type hard-coating agent makes it possible to provide transparent plastic molded products having both superior weatherability and superior scratch resistance.

What is claimed is:

1. A primer composition, comprising:

(A) an acrylic resin;

(B) a benzotriazole compound having not more than 1% by weight of heat loss when held at 150° C. for one hour;

(C) an organic solvent; and (D) a compound prepared by permitting the reaction product of an amino functional alkoxysilane, an epoxy functional alkoxysilane and a silylating agent to react with an acid halide, an acid anhydride or an acid isopropenyl compound of a carboxylic acid.

2. The primer composition according to claim 1, wherein said acrylic resin contains an alkoxysilyl group.

3. The primer composition according to claim 1, wherein said benzotriazole compound is a compound selected from the group consisting of 6-(2-benzotriazolyl)-4-t-octyl-6'-t-butyl-4'-methyl-2,2'-methylenebisphenol and 2-[2'-hydroxy-3',5'-bis($\alpha,\alpha$-dimethylbenzyl)phenyl]benzotriazole.

4. The primer composition according to claim 1, wherein said benzotriazole compound is contained in an amount of from 0.1% by weight to 30% by weight based on the whole components of the primer composition but excluding the organic solvent.

5. An article having a primer coat on the surface of a substrate, which is obtained by coating the primer composition according to claim 1 on the surface of the substrate, followed by curing to form the primer coat.

6. An article having a primer coat on the surface of a substrate and a protective coat formed on the primer coat, which is obtained by coating the primer composition according to claim 1 on the surface of a transparent plastic substrate to form a primer coat on the surface of the substrate, and coating on the primer coat a silicone type hard-coating fluid containing at least one siloxane compound selected from an alkoxysilane and a partial hydrolysis-condensation product thereof, to form the protective coat.

7. A primer composition, comprising:

(A) an acrylic resin containing an alkoxysilyl group;

(B) a benzotriazole compound having not more than 1% by weight of heat loss when held at 150° C. for one hour; and (C) an organic solvent.

8. The primer composition according to claim 7, wherein said benzotriazole compound is a compound selected from the group consisting of 6-(2-benzotriazolyl)-4-t-octyl-6'-t-butyl-4'-methyl-2,2'-methylenebisphenol and 2-[2'-hydroxy-3',5'-bis($\alpha,\alpha$-dimethylbenzyl)phenyl]benzotriazole.

9. The primer composition according to claim 7, wherein said benzotriazole compound is present in an amount of 0.1% by weight to 30% by weight, based on the total weight of primer composition excluding the organic solvent.

10. An article having a primer coat on the surface of a substrate, which is prepared by coating the primer composition of claim 7 on the surface of the substrate, followed by curing to form the primer coat.

11. An article having a primer coat on the surface of a substrate and a protective coat formed on the primer coat, which is prepared by coating the primer composition of claim 7 on the surface of a transparent plastic substrate to form a primer coat on the surface of the substrate, and coating, on the primer coat, a silicone hard-coating fluid containing at least one siloxane compound selected from the group consisting of an alkoxysilane and a partial hydrolysis-condensation product thereof, to form the protective coat.

* * * * *